US010368378B2

(12) United States Patent
Foster et al.

(10) Patent No.: US 10,368,378 B2
(45) Date of Patent: Jul. 30, 2019

(54) CONTROLLING ELECTRONIC DEVICES BASED ON WIRELESS RANGING

(71) Applicant: Apple Inc., Cupertino, CA (US)

(72) Inventors: James H. Foster, Oxford (GB); Duncan R. Kerr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/424,394

(22) Filed: Feb. 3, 2017

(65) Prior Publication Data

US 2017/0229009 A1 Aug. 10, 2017

Related U.S. Application Data

(60) Provisional application No. 62/291,504, filed on Feb. 4, 2016.

(51) Int. Cl.
*G05D 23/13* (2006.01)
*H04W 76/14* (2018.01)
(Continued)

(52) U.S. Cl.
CPC ............ *H04W 76/14* (2018.02); *G01C 21/20* (2013.01); *G06F 1/1626* (2013.01);
(Continued)

(58) Field of Classification Search
CPC .. G06F 3/017; G08C 17/02; H04N 21/44218; H04W 4/02; G06K 9/00335
(Continued)

(56) References Cited

U.S. PATENT DOCUMENTS 7,062,279 B2   6/2006  Cedervall et al.
8,464,184 B1*  6/2013  Cook ................... G06F 1/1694
                                                   709/213
(Continued)

FOREIGN PATENT DOCUMENTS

WO      2016005649 A1    1/2016

OTHER PUBLICATIONS

PCT Patent Application No. PCT/US2017/016478—International Search Report and Written Opinion dated May 12, 2017.
(Continued)

*Primary Examiner* — Munear T Akki
(74) *Attorney, Agent, or Firm* — Dickinson Wright RLLP

(57) ABSTRACT

A wireless communication device may wirelessly control an object, such as a physical device, directly or through interaction with a virtual representation (or placeholder) of the object situated at a predefined physical location. In particular, the wireless communication device may identify an intent gesture performed by a user that indicates intent to control the object. For example, the intent gesture may involve pointing or orienting the wireless communication device toward the object, with or without additional input. Then, the wireless communication device may determine the object associated with the intent gesture using wireless ranging and/or device orientation. Moreover, the wireless communication device may interpret sensor data from one or more sensors associated with the wireless communication device to determine an action gesture corresponding to a command or a command value. The wireless communication device may then transmit the command value to control the object.

19 Claims, 7 Drawing Sheets

(51) Int. Cl.
*H04W 4/02* (2018.01)
*G06F 3/14* (2006.01)
*G06F 3/01* (2006.01)
*G08C 17/02* (2006.01)
*G06F 1/16* (2006.01)
*G01C 21/20* (2006.01)

(52) U.S. Cl.
CPC .......... *G06F 1/1694* (2013.01); *G06F 1/1698* (2013.01); *G06F 3/011* (2013.01); *G06F 3/016* (2013.01); *G06F 3/017* (2013.01); *G06F 3/14* (2013.01); *G08C 17/02* (2013.01); *H04W 4/023* (2013.01); *G08C 2201/32* (2013.01)

(58) Field of Classification Search
USPC .......... 340/539.23, 12.5, 12.22, 12.28, 686.6
See application file for complete search history.

(56) References Cited

U.S. PATENT DOCUMENTS

| | | | |
|---|---|---|---|
| 8,665,075 B2 | 3/2014 | Pratt et al. | |
| 2007/0130582 A1* | 6/2007 | Chang | G06F 3/0346 725/37 |
| 2008/0152263 A1* | 6/2008 | Harrison | G06F 1/1626 382/313 |
| 2009/0167919 A1 | 7/2009 | Anttila et al. | |
| 2010/0328201 A1 | 12/2010 | Marvit et al. | |
| 2011/0060652 A1 | 3/2011 | Morton | |
| 2011/0095873 A1* | 4/2011 | Pratt | G08C 17/02 340/12.28 |
| 2011/0175822 A1* | 7/2011 | Poon | G06F 3/04842 345/173 |
| 2011/0310087 A1 | 12/2011 | Wright, Jr. et al. | |
| 2013/0096575 A1* | 4/2013 | Olson | G06T 19/003 606/130 |
| 2013/0097525 A1 | 4/2013 | Kim et al. | |
| 2013/0328762 A1 | 12/2013 | McCulloch et al. | |
| 2014/0016821 A1 | 1/2014 | Arth et al. | |
| 2014/0320274 A1* | 10/2014 | De Schepper | G06F 3/017 340/12.22 |
| 2014/0337732 A1* | 11/2014 | Bevilacqua | G06F 3/017 715/716 |
| 2015/0071438 A1 | 3/2015 | Lambert | |
| 2015/0082256 A1* | 3/2015 | Lee | G06F 3/0488 715/863 |
| 2015/0088283 A1* | 3/2015 | Fiedler | H04L 12/282 700/83 |
| 2016/0205501 A1 | 7/2016 | Lee et al. | |
| 2016/0224036 A1* | 8/2016 | Baker | G05D 23/1393 |
| 2016/0241910 A1* | 8/2016 | Rowe | H04N 21/44218 |
| 2016/0334880 A1* | 11/2016 | Favre | G06K 9/00335 |
| 2016/0358459 A1* | 12/2016 | Singhar | G08C 17/02 |
| 2017/0038948 A1 | 2/2017 | Cun et al. | |
| 2017/0147074 A1* | 5/2017 | Buttolo | G06F 3/017 |
| 2017/0228935 A1 | 8/2017 | Foster et al. | |
| 2018/0103339 A1 | 4/2018 | Roundtree et al. | |

OTHER PUBLICATIONS

Australian Patent Application No. 2017214547—Examination Report No. 1 dated Mar. 26, 2019.

* cited by examiner

CONTROLLING ELECTRONIC DEVICES BASED ON WIRELESS RANGING

CROSS-REFERENCE TO RELATED APPLICATION

This application claims the benefit of U.S. Provisional Patent Application No. 62/291,504, entitled "CONTROLLING ELECTRONIC DEVICES BASED ON WIRELESS RANGING," by James H. Foster, filed on Feb. 4, 2016, the contents of which are incorporated by reference herein in their entirety for all purposes.

This application is related to U.S. patent application Ser. No. 15/424,408, entitled "DISPLAYING INFORMATION BASED ON WIRELESS RANGING", by James H. Foster, filed Feb. 3, 2017, the contents of which are incorporated by reference herein in their entirety for all purposes.

FIELD

The described embodiments relate to wireless communications among electronic devices and user interfaces, including systems and techniques for controlling electronic devices using gestures and metrics, such as wireless ranging.

BACKGROUND

The usefulness and, therefore, the popularity of many electronic devices, including portable electronic devices (such as cellular telephones), is often gated by ease of use. In particular, the ease of use of many electronic devices is typically determined by the user interface. The user interface is the gateway through which users' actions and/or behaviors are defined and received, including user attempts to access the features of an electronic device. Consequently, the user interface is integral to an overall user experience.

However, there are limitations associated with existing user interfaces, especially the user interfaces for small, handheld electronic devices. For example, many existing user interfaces are constrained by the need for the user to activate or turn on an electronic device. Then, the user may need to make physical contact with the user interface, such as is the case with user interfaces displayed on touch-sensitive displays. Therefore, many existing user interfaces produce frustrating user interactions, which can degrade the user experience.

SUMMARY

Embodiments that relate to a wireless communication electronic device that controls an object are disclosed. During operation, the wireless communication device identifies a received intent gesture indicating intent to control the object, where the object is located proximate to the wireless communication device in an environment. Then, the wireless communication device determines the object associated with the intent gesture using wireless ranging. Moreover, the wireless communication device accesses sensor data from one or more sensors associated with the wireless communication device and interprets the accessed sensor data to determine a command value, which is transmitted to control the object.

Note that the object may be a physical object. For example, the physical object may include: a computing device, a display, a printer, a communications device, an audio device, an appliance, a wearable device, a home automation device, an environmental control, and/or an accessory. Alternatively, the object may be a virtual object. Further, the virtual object may function as a proxy to associate the command value with a physical object.

Moreover, the wireless ranging may use a wireless transmission characteristic or wireless ranging computation to determine a distance between the wireless communication device and the object. Furthermore, the accessed sensor data may include an orientation value corresponding to the wireless communication device, the orientation value being determined using a compass, an accelerometer, and/or a gyroscope.

Additionally, the command value may include a command to: pair the wireless communication device with the object; change an operational setting of the object; and/or execute a function. Note that the command value may cause the object to transmit a response including a sensor value and/or may request access to a resource.

In some embodiments, the wireless communication device can determine the proximity of the object in the environment using an ultrasonic chirp.

Other embodiments provide a computer-program product for use with the wireless communication device. This computer-program product includes instructions for at least some of the operations performed by the wireless communication device.

Still other embodiments provide a method that includes one or more of the operations performed by the wireless communication device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing operation, control, interaction and other communications between multiple associated devices. These drawings in no way limit any changes in form and detail that may be made to the embodiments by one skilled in the art without departing from the spirit and scope of the embodiments. The embodiments will be readily understood by the following detailed description in conjunction with the accompanying drawings, where like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
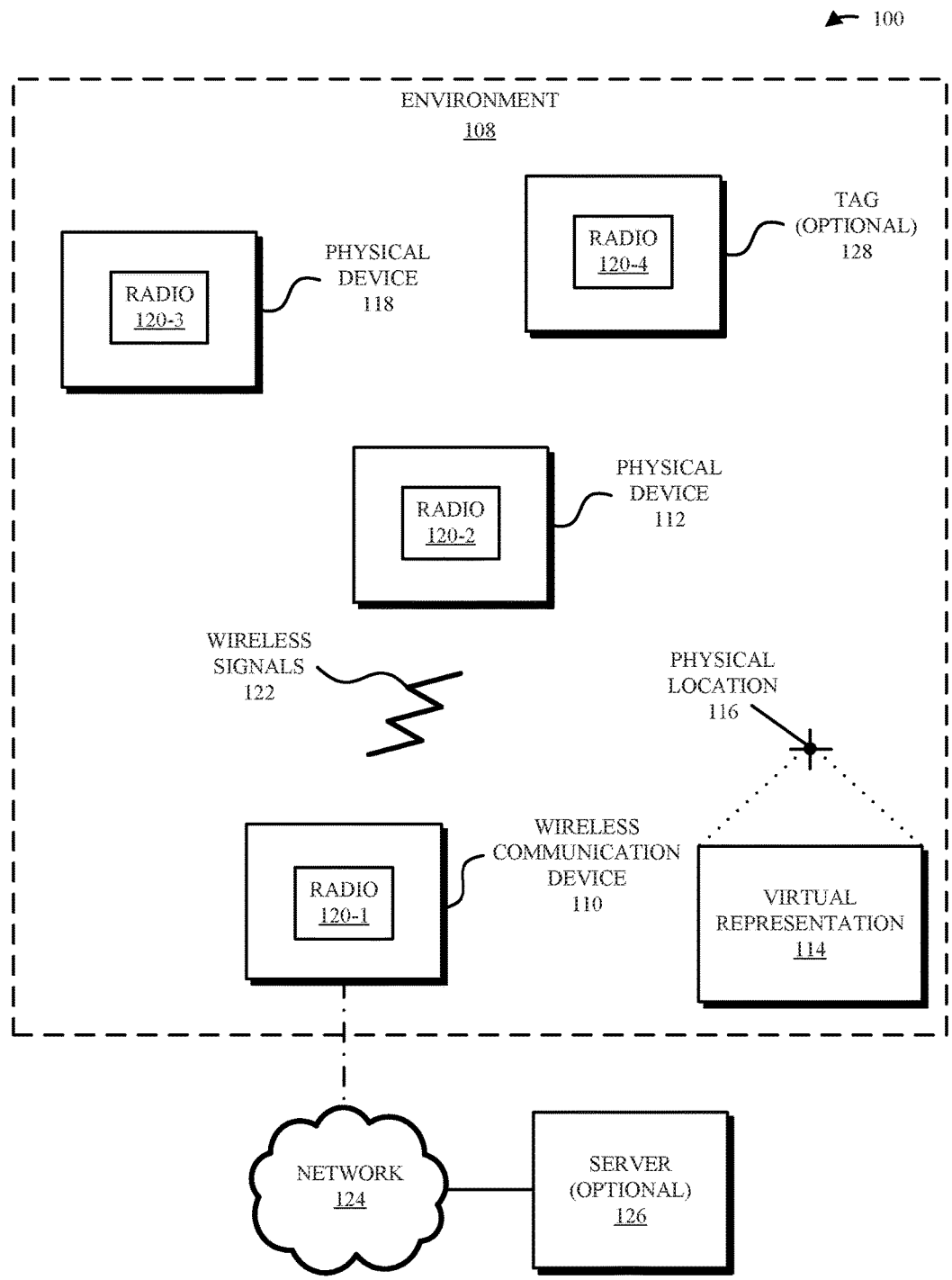
FIG. 1 is a block diagram illustrating an example of electronic devices communicating wirelessly.

The disclosed embodiments relate to a wireless communication device (such as a smartphone or a smart watch) that uses one or more measurements (such as wireless ranging or radio-based distance measurements) to remotely control an object, such as a physical device or a virtual representation (or placeholder) associated with a physical device, at a physical reference location. In particular, the wireless communication device may implement a user-interface technique in which one or more measurements are used to remotely (e.g., from a distance and, in general, without physical contact) control operation of the object. Note that the object is sometimes referred to as a 'controllable device' or a 'target device.'

This user-interface technique may remove the constraints associated with many existing user interfaces. For example, a user may no longer need to open or unlock the wireless communication device (e.g., by providing a passcode or a biometric identifier, such as a fingerprint) in order control the object. Similarly, by facilitating control of the object from a distance, this user-interface technique may eliminate the need for a user to be in physical contact with a user interface on or associated with the object. Consequently, the user-interface technique may improve the user experience when using the wireless communication device, and thus may increase customer satisfaction and retention.

Note that the communication used during wireless communication between electronic devices in the user-interface technique may be in accordance with a communication protocol, such as: an Institute of Electrical and Electronics Engineers (IEEE) 802.11 standard (which is sometimes referred to as Wi-Fi). For example, the communication may be used with IEEE 802.11ax, which is used as an illustrative example in the discussion that follows. However, the user-interface technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

In particular, the wireless communication device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the wireless communication device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol.

The wireless communication device, in some embodiments, can also operate as part of a wireless communication system, which can include a set of client devices, which can also be referred to as stations, client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

Thus, in some embodiments, the wireless communication device can act as a communications hub that provides access to a WLAN and/or to a WWAN and, thus, to a wide variety of services that can be supported by various applications executing on the wireless communication device. Thus, the wireless communication device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Wireless ranging can be performed using any standard or proprietary ranging technique, or any combination of standard and/or proprietary ranging techniques. A wireless ranging operation can be performed to determine a distance between devices (e.g., between an initiator and a responder), a direction between devices, or both. For example, a Time of Flight/Time of Arrival (ToF/ToA) can be determined for one or more messages between the devices, which can be used to establish a measure of distance. The one or more messages can have any format and can be transmitted using any wireless protocol, e.g., an 802.11 protocol, Bluetooth, etc. In some embodiments, ToF/ToA can be determined using a bi-directional exchange of two or more messages. Also, in some embodiments, one or more messages used to perform ranging can be secured, e.g., by encrypting or otherwise protecting at least a portion of the content. Further, in some embodiments, the direction of the source of one or more wireless signals can be determined using a technique such as Angle of Arrival (AoA). For example, AoA estimation can be performed using multiple receive elements (e.g., elements of an antenna array) to measure the different times (TDOA) and/or different phases (PDOA) of arrival of a signal. Additionally or alternatively, in some embodiments, directionality can be determined by measuring Doppler shifts to establish a frequency difference of arrival (FDOA). Wireless ranging techniques can be applied individually or in combination to perform a single ranging operation. Further, wireless ranging techniques can be applied individually or in combination to perform on-going ranging operations, such as continuous or intermittent ranging, and a history of measurements can be captured and used in performing operations based on range and/or direction.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

We now describe embodiments of the user-interface technique. FIG. 1 presents a block diagram 100 illustrating an example of electronic devices communicating wirelessly. In particular, a wireless communication device 110 (such as a smartphone, a laptop computer, a wearable, or a tablet) and physical device 112 may communicate wirelessly. These electronic devices may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Further, there may be a virtual representation 114 at a physical location 116. The virtual representation 114 can correspond to a physical device 118, such that virtual representation 114 functions as a proxy for physical device 118. In this case, wireless communication device 110 may identify and interact with virtual representation 114, but may transmit wireless signals that are received at physical device 118. For example, virtual representation 114 may be associated with a thermostat and an adjustment by wireless communication device 110 of the thermostat may be provided through interaction with virtual representation 114, but received and implemented by an environmental unit, e.g., physical device 118.

Note that physical devices 112 and/or 118 may include: an appliance (such as an oven, a toaster, a refrigerator, a dish washer or a laundry machine), another electronic device (such as a computer, a laptop, a tablet or a computing device), an entertainment device (such as a television, a display, a radio receiver or a set-top box), an audio device, a projector, a security device (such as an alarm or a door lock), a communication device (such as a smartphone), a monitoring device (such as a smoke detector or a carbon-monoxide detector), an environmental control (such as a thermostat, a light switch, or a shade), an accessory (such as a keyboard, a mouse or a speaker), a printer, a wearable device, a home-automation device, a resource in an environment 108 (such as a transportation resource, a shared computing resource, a medical resource, a display resource, a security resource, an accessibility resource or a safety resource), etc. Moreover, virtual representation 114 may be implemented as: a sticker, a picture, a piece of ceramic, a geo-fence, one or more coordinates defining a location, etc. In some embodiments, physical device 118 includes: a light switch, a thermostat, etc.

As described further below with reference to FIG. 2, wireless communication device 110, physical device 112, and/or physical device 118 may include subsystems, such as a networking subsystem, a memory subsystem and a processor subsystem. In addition, wireless communication device 110, physical device 112, and/or physical device 118 may include radios 120 in the networking subsystems. More generally, wireless communication device 110, physical device 112, and/or physical device 118 can include (or can be included within) any electronic devices with networking subsystems that enable wireless communication device 110, physical device 112, and/or physical device 118 to wirelessly communicate with another electronic device. This can include transmitting beacons on wireless channels to enable electronic devices to make initial contact with or to detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As can be seen in FIG. 1, wireless signals 122 (represented by a jagged line) are communicated by radios 120-1 and 120-2 in wireless communication device 110 and physical device 112, respectively. For example, wireless communication device 110 and physical device 112 may exchange packets using a Bluetooth protocol in a wireless personal area network (WPAN) or a Wi-Fi protocol in a wireless local area network (WLAN).

Figure 4:
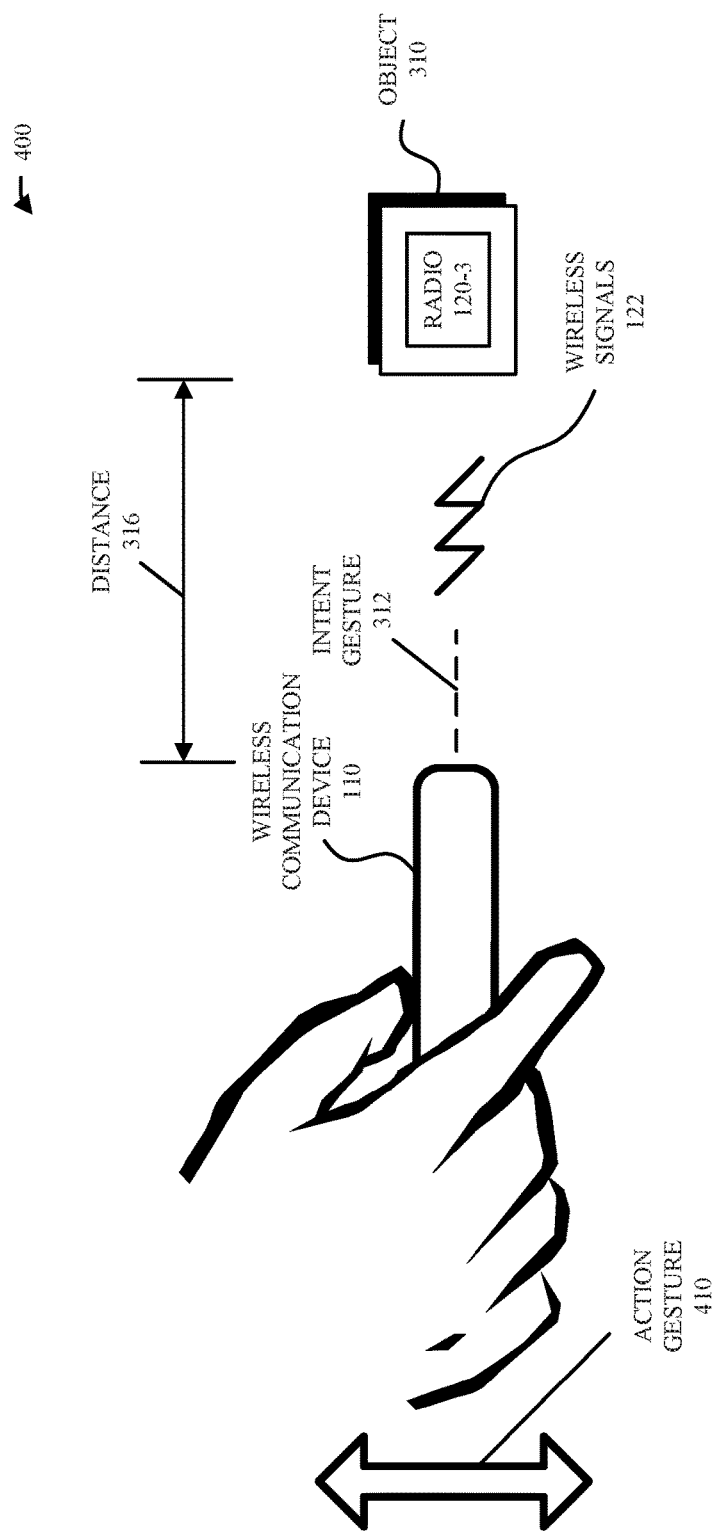
Figure 5:
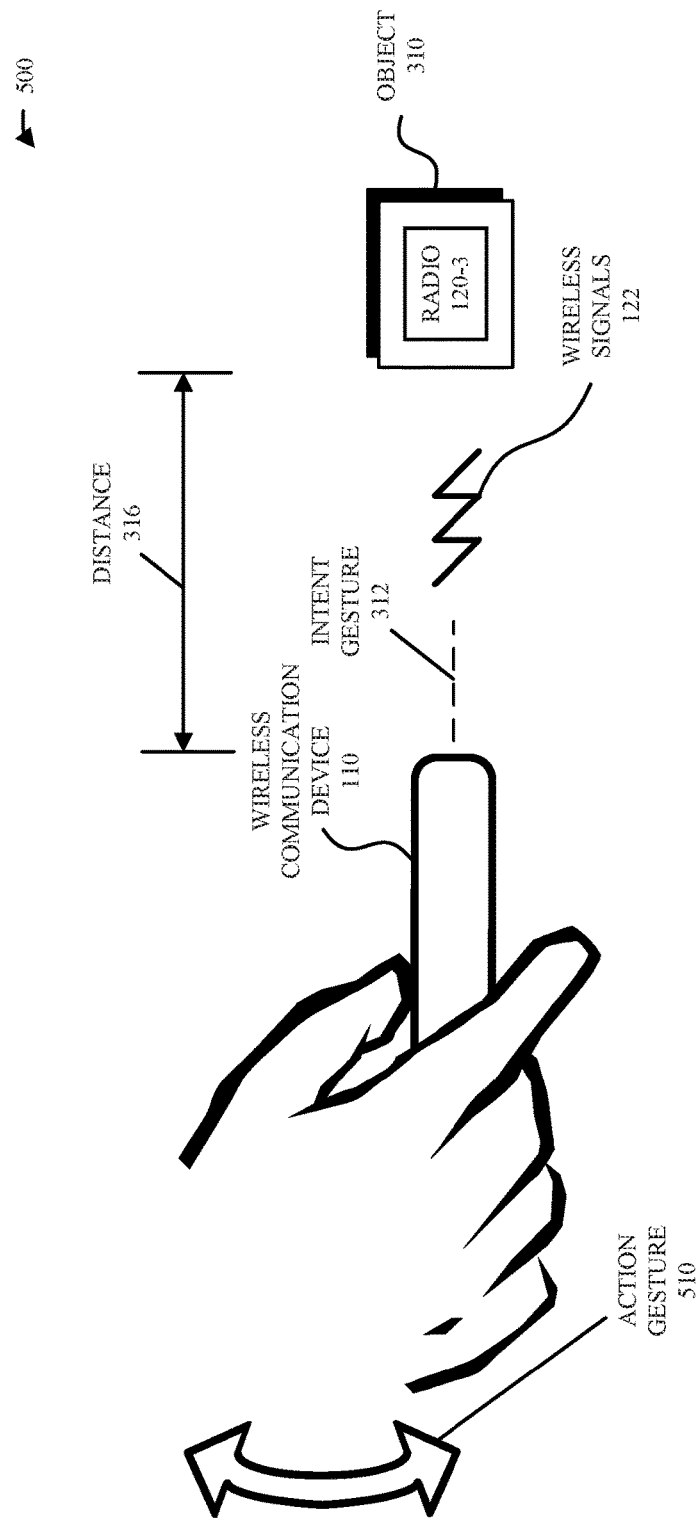

In particular, as described further below with reference to FIGS. 3-5, wireless communication device 110 may transmit a frame or a packet that includes a transmission time. When this frame or packet is received by physical device 112, the arrival time may be determined. Based on the product of the time of flight (the difference of the arrival time and the transmission time) and the speed of propagation, the distance between wireless communication device 110 and physical device 112 can be calculated. This distance may be communicated in a subsequent transmission of a frame or a packet from physical device 112 to wireless communication device 110 along with an identifier (such as a unique identifier) of physical device 112 or a user of physical device 112. Alternatively, physical device 112 may transmit a frame or a packet that includes a transmission time and an identifier of physical device 112, and wireless communication device 110 may determine the distance between wireless communication device 110 and physical device 112 based on the product of the time of flight (the difference of a arrival time and the transmission time) and the speed of propagation. Note that this approach for dynamically determining distances between electronic devices that wirelessly communicate is sometimes referred to as 'wireless ranging.' Further, wireless ranging (separately or along with other sensor input, such as a compass, gyroscope and/or accelerometer) can be used to disambiguate control input intent when multiple target devices may be located close to one another or in the same line of sight. A variation on this approach may be used, in which wireless communication device 110 senses gesture input directed at physical location 116 through sensor input (e.g., compass, gyroscope and/or accelerometer) and determines that one or more control signals should be transmitted to an associated device, e.g., physical device 118 associated with virtual representation 114. Similarly, another variation on this approach in which wireless communication device 110 transmits frames or packets that are reflected at physical location 116 may optionally be used to dynamically determine the distance between wireless communication device 110 and virtual representation 114. Thus, wireless ranging may be used by wireless communication device 110 to determine when an object (such as physical device 112 or virtual representation 114) is proximate in environment 108.

While the preceding example illustrated wireless ranging with synchronized clocks in wireless communication device 110 and physical device 112, in other embodiments the clocks are not synchronized. For example, the position of wireless communication device 110 or physical device 112 may be estimated based on the speed of propagation and the time of arrival data of wireless signals 122 at several receivers at different known locations (which is sometimes referred to as 'differential time of arrival') even when the transmission time is unknown or unavailable. More generally, a variety of radiolocation techniques may be used, such as: determining distance based on a difference in the power of the received signal strength indicator (RSSI) relative to the original transmitted signal strength (which may include corrections for absorption, refraction, shadowing and/or reflection); determining the angle of arrival at a receiver (including non-line-of-sight reception) using a directional antenna or based on the differential time of arrival at an array of antennas with known location(s); determining the distance based on backscattered wireless signals; and/or determining the angle of arrival at two receivers having known location (i.e., trilateration or multilateration). Note that wireless signals 122 may include transmissions over GHz or multi-GHz bandwidths to create pulses of short duration (such as, e.g., approximately 1 ns), which may allow the distance to be determined within 0.3 m (e.g., 1 ft.). In some embodiments, the wireless ranging is facilitated using location information, such as a location of one or more of electronic devices in FIG. 1 that are determined or specified by a local positioning system, a Global Positioning System and/or a wireless network.

Moreover, wireless communication device 110 may include one or more sensors that measure (or generate) sensor data. For example, the one or more sensors may include: one or more compasses, one or more accelerometers, and/or one or more gyroscopes that measure an orientation (or an orientation value) or a direction of wireless communication device 110; one or more accelerometers that measures an acceleration of wireless communication device 110; a transceiver (such as radio 120-1) that determines a metric that characterizes wireless communication between wireless communication device 110 and another electronic device (such as physical device 112 or, in embodiments in which reflected wireless signals are received, wireless communication device 110); one or more touch sensors configured to receive touch input, e.g., via a touch screen; and/or one or more microphones or acoustic transducers that measure ambient sound in environment 108 of wireless communication device 110. In some embodiments, wireless communication device 110 determines the proximity of the object in environment 108 using an ultrasonic chirp provided by an acoustic transducer. This ultrasonic chirp may be outside the range of human hearing. In the discussion that follows, 'proximity' of electronic devices should be understood to include at least being within wireless-communication range, and may further restrict the electronic devices to be in the same room or within a predefined distance (such as within 10 m or 30 m).

As described further below with reference to FIGS. 3-5, during the user-interface technique, wireless communication device 110 may use wireless ranging and/or the sensor data to control physical devices 112 and/or 118. In particular, wireless communication device 110 may identify an intent gesture of a user of wireless communication device 110. For example, the user may point wireless communication device 110 toward physical location 116 (and, thus, towards virtual representation 114) or toward physical device 112, and wireless communication device 110 may identify this 'intent gesture' based on the orientation of wireless communication device 110 (either in isolation or relative to the position and/or orientation of physical device 112 or virtual representation 114) and/or movement of the wireless communication device 110 (e.g., a predefined intent gesture motion, such as a forward extension (or push)). Then, wireless communication device 110 may determine the object associated with the intent gesture (such as physical device 112 or virtual representation 114), including using wireless ranging. For example, the object corresponding to the intent gesture may be determined based at least in part on the distance to the object determined using wireless ranging as well as the orientation (or relative orientations).

Moreover, the user may then perform an 'action gesture' by moving wireless communication device 110, e.g., in two or three dimensions. This action gesture may be captured in the detected/measured sensor data acquired by one or more sensors in or associated with wireless communication device 110. Next, wireless communication device 110 may interpret the sensor data to determine the action gesture and, thus, a command or command value. Furthermore, wireless communication device 110 may transmit, in a frame or a packet, the command or command value to the corresponding device to be controlled, e.g., physical device 112 or physical device 118.

As described further below, note that the command value may include a command to: pair or associate wireless communication device 110 with the object; change an operational setting of the object (such as turning lights on or off, or change a temperature of a thermostat, adjusting volume, channel, and/or playback settings); transfer data (such as media or text data); and/or execute any other such function. Note that the command value may cause the object to transmit a response, e.g., including a sensor value, back to wireless communication device 110 and/or may request access to a resource (such as a wireless printer).

Thus, the user-interface technique may allow wireless communication device 110 to control an object (or functionality associated with an object) from a distance, including without the user opening or unlocking wireless communication device 110. This capability may also provide the user new degrees of freedom in controlling or interacting with the object. Consequently, the user-interface technique may improve the user experience when using wireless communication device 110 and the object, and thus may increase user satisfaction and retention.

In the described embodiments, processing a packet or frame in one of wireless communication device 110, physical device 112, and/or physical device 118 includes: receiving wireless signals 122 encoding the packet or frame; decoding/extracting the packet or frame from received wireless signals 122 to acquire the packet or frame; and processing the packet or frame to determine information contained in the packet or frame (such as data in the payload).

In general, the communication via the WLAN in the user-interface technique may be characterized by a variety of metrics (or communication-performance metrics). For example, the metric may include: an RSSI, a data rate, a data rate for successful communication (which is sometimes referred to as a 'throughput'), an error rate (such as a retry or resend rate), a mean-square error of equalized signals relative to an equalization target, inter-symbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers or types of electronic devices may be present. For example, some embodiments include more or fewer electronic devices. As another example, in another embodiment, different electronic devices can be transmitting and/or receiving packets or frames.

We now describe embodiments of an electronic device. FIG. 2 presents a block diagram of an example of electronic device 200 (which may be a portable electronic device or a station). For example, electronic device 200 may be one of: wireless communication device 110, physical device 112, and/or physical device 118 in FIG. 1. Electronic device 200 may include processing subsystem 210, memory subsystem 212, networking subsystem 214, display subsystem 226, measurement subsystem 230, and user-interaction subsystem 232. Processing subsystem 210 includes one or more devices configured to perform computational operations. For example, processing subsystem 210 can include one or more microprocessors, application-specific integrated circuits (ASICs), microcontrollers, programmable-logic devices, and/or one or more digital signal processors (DSPs).

Memory subsystem 212 includes one or more devices for storing data and/or instructions for processing subsystem 210 and networking subsystem 214. For example, memory subsystem 212 can include dynamic random access memory (DRAM), static random access memory (SRAM), a read-only memory (ROM), flash memory, and/or other types of memory. In some embodiments, instructions for processing subsystem 210 in memory subsystem 212 include: one or more program modules or sets of instructions (such as program module 222 or operating system 224), which may be executed by processing subsystem 210. For example, a ROM can store programs, utilities or processes to be executed in a non-volatile manner, and DRAM can provide volatile data storage, and may store instructions related to the operation of electronic device 200. Note that the one or more computer programs may constitute a computer-program mechanism or software. Moreover, instructions in the various modules in memory subsystem 212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 210. In some embodiments, the one or more computer programs are distributed over a network-coupled computer system so that the one or more computer programs are stored and executed in a distributed manner.

In addition, memory subsystem 212 can include mechanisms for controlling access to the memory. In some embodiments, memory subsystem 212 includes a memory hierarchy that includes one or more caches coupled to a memory in electronic device 200. In some of these embodiments, one or more of the caches is located in processing subsystem 210.

In some embodiments, memory subsystem 212 is coupled to one or more high-capacity mass-storage devices (not shown). For example, memory subsystem 212 can be coupled to a magnetic or optical drive, a solid-state drive, or another type of mass-storage device. In these embodiments, memory subsystem 212 can be used by electronic device 200 as fast-access storage for often-used data, while the mass-storage device is used to store less frequently used data.

Figure 2:
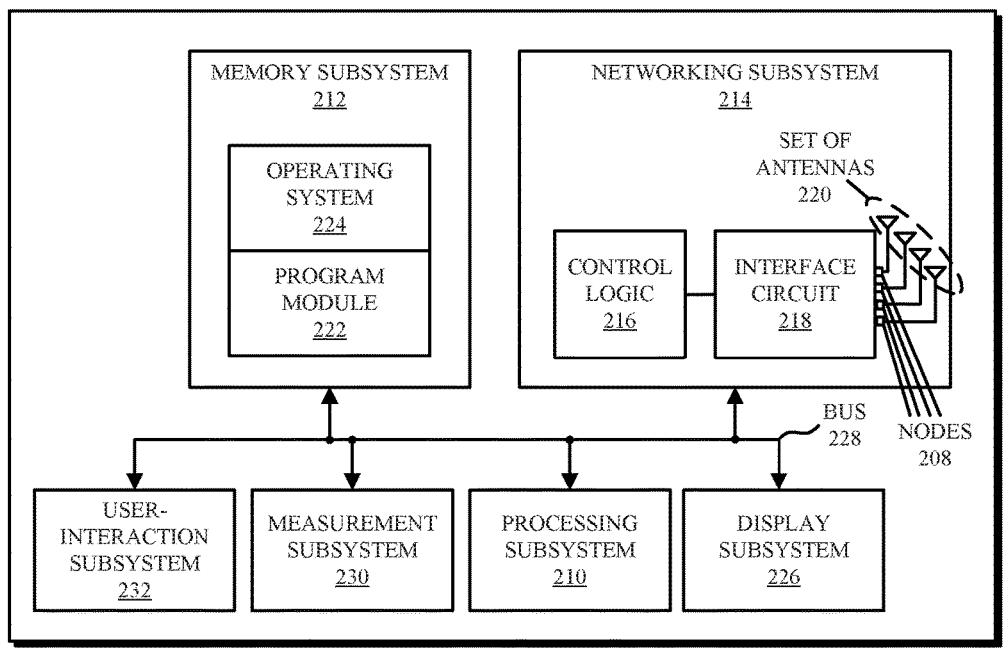
FIG. 2 provides a block diagram illustrating an example of a wireless communication device that performs wireless ranging.

Networking subsystem 214 includes one or more devices configured to couple to and communicate on a wired and/or wireless network (i.e., to perform network operations), including: control logic 216, an interface circuit 218 and a set of antennas 220 (or antenna elements) in an adaptive array that can be selectively turned on and/or off by control logic 216 to create a variety of optional antenna patterns or 'beam patterns.' (While FIG. 2 includes set of antennas 220, in some embodiments electronic device 200 includes one or more nodes, such as nodes 208, e.g., a pad, which can be coupled to set of antennas 220. Thus, electronic device 200 may or may not include set of antennas 220.) For example, networking subsystem 214 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 200 may use the mechanisms in networking subsystem 214 for performing simple wireless communication between the electronic devices, e.g., transmitting advertising or beacon frames and/or scanning for advertising frames transmitted by other electronic devices.

Within electronic device 200, processing subsystem 210, memory subsystem 212, networking subsystem 214, display subsystem 226, measurement subsystem 230, and user-interaction subsystem 232 are coupled together using bus 228 that facilitates data transfer between these components. Bus 228 may include an electrical, optical, and/or electro-optical connection that the subsystems can use to communicate commands and data among one another. Although only one bus 228 is shown for clarity, different embodiments can include a different number or configuration of electrical, optical, and/or electro-optical connections among the subsystems.

In some embodiments, electronic device 200 includes display subsystem 226 for displaying information on a display, which may include a display driver and the display, such as a liquid-crystal display, a multi-touch touchscreen, etc. Display subsystem 226 may be controlled by processing subsystem 210 to display information to a user (e.g., information relating to incoming, outgoing, or an active communication session). In some embodiments, display subsystem 226 can be configured to generate display information for non-native displays (e.g., displays associated with other devices).

Electronic device 200 can also include a measurement subsystem 230 with one or more sensors that allows electronic device 200 to perform one or more type of measurements. For example, the one or more sensors may include: one or more compasses, one or more accelerometers, one or more gyroscopes, one or more microphones or acoustic transducers, one or more environmental sensors (such as a temperature sensor and/or an altimeter), one or more light sensors (such as an ambient light sensor), one or more touch sensors (such as a touchscreen), one or more biometric sensors (such as a fingerprint sensor), etc. Note that the one or more sensors may include physical sensors in electronic device 200 and/or a virtual sensor (such as a sensor implemented, at least in part, in software). In some embodiments, at least some of the one or more sensors determine sensor data based on information received from a remote electronic device.

Moreover, electronic device 200 may include a user-interaction subsystem 232. For example, user-interaction subsystem 232 can include a variety of user-input devices, such as: a button, keypad, dial, touchscreen, audio-input interface, visual/image-capture-input interface, input in the form of sensor data, etc. Alternatively or additionally, user-interaction subsystem 232 may include a variety of user-output devices, such as: one or more speakers (which may provide a directional acoustic array), a haptic transducer, etc.

Electronic device 200 can be (or can be included in) any electronic device with at least one network interface. For example, electronic device 200 may include: a cellular telephone or a smartphone, a tablet computer, a laptop computer, a notebook computer, a personal or desktop computer, a netbook computer, a computing device, a shared computing device (such as a printer), a media player device, an electronic book device, a smart watch, a wearable computing device, a wearable device, a portable computing device, a consumer-electronic device, an access point, a router, a switch, communication equipment or a communication device, test equipment, an appliance, an entertainment device, a television, a display, a radio receiver, a set-top box, an audio device, a projector, a medical device (such as an automated external defibrillator), a security device, an alarm, a monitoring device (e.g., a smoke detector or a carbon-monoxide detector), an environmental control, a thermostat, a light switch, an accessory, a keyboard, a mouse, a speaker, a printer, a home-automation device, a vehicle, an electronic lock, as well as any other type of electronic computing device having wireless communication capability that can include communication via one or more wireless communication protocols.

Although specific components are used to describe electronic device 200, in alternative embodiments, different components and/or subsystems may be present in electronic device 200. For example, electronic device 200 may include one or more additional processing subsystems, memory subsystems, networking subsystems, and/or display subsystems. Additionally, one or more of the subsystems may not be present in electronic device 200. Moreover, in some embodiments, electronic device 200 may include one or more additional subsystems that are not shown in FIG. 2. Also, although separate subsystems are shown in FIG. 2, in some embodiments some or all of a given subsystem or component can be integrated into one or more of the other subsystems or component(s) in electronic device 200. For example, in some embodiments program module 222 is included in operating system 224 and/or control logic 216 is included in interface circuit 218.

Moreover, the circuits and components in electronic device 200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 214. This integrated circuit may include hardware and/or software mechanisms that are used for transmitting wireless signals from electronic device 200 and receiving signals at electronic device 200 from other electronic devices. Aside from the mechanisms herein described, radios are generally known in the art and hence are not described in detail. In general, networking subsystem 214 and/or the integrated circuit can include any number of radios. Note that the radios in multiple-radio embodiments function in a similar way to the described single-radio embodiments.

In some embodiments, networking subsystem 214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein includes receiving signals from other electronic devices and possibly performing one or more processing operations on the received signals, e.g., performing wireless ranging, etc.)

In some embodiments, an output of a process for designing the integrated circuit, or a portion of the integrated circuit, which includes one or more of the circuits described herein may be a computer-readable medium such as, e.g., a programmable memory, a magnetic tape, or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

The user-interface technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the user-interface technique may be implemented using program module 222, operating system 224 (such as a driver for interface circuit 218) or in firmware in interface circuit 218. Alternatively or additionally, at least some of the operations in the user-interface technique may be implemented in a physical layer, such as hardware in interface circuit 218. In an exemplary embodiment, the user-interface technique is implemented, at least in part, in a MAC layer in interface circuit 218.

In an exemplary embodiment, the user-interface technique is used to provide directional control. In particular, when the position and orientation of a wireless communication device relative to an object are determined based on one or more measurements, one or more gestures input on or performed with the wireless communication device may be interpreted as a command for the object. As described further below, wireless ranging and sensor-data (from a gyroscope, an accelerometer, a compass, etc.) inputs may be used to select, pair with, and/or command the object.

Figure 3:
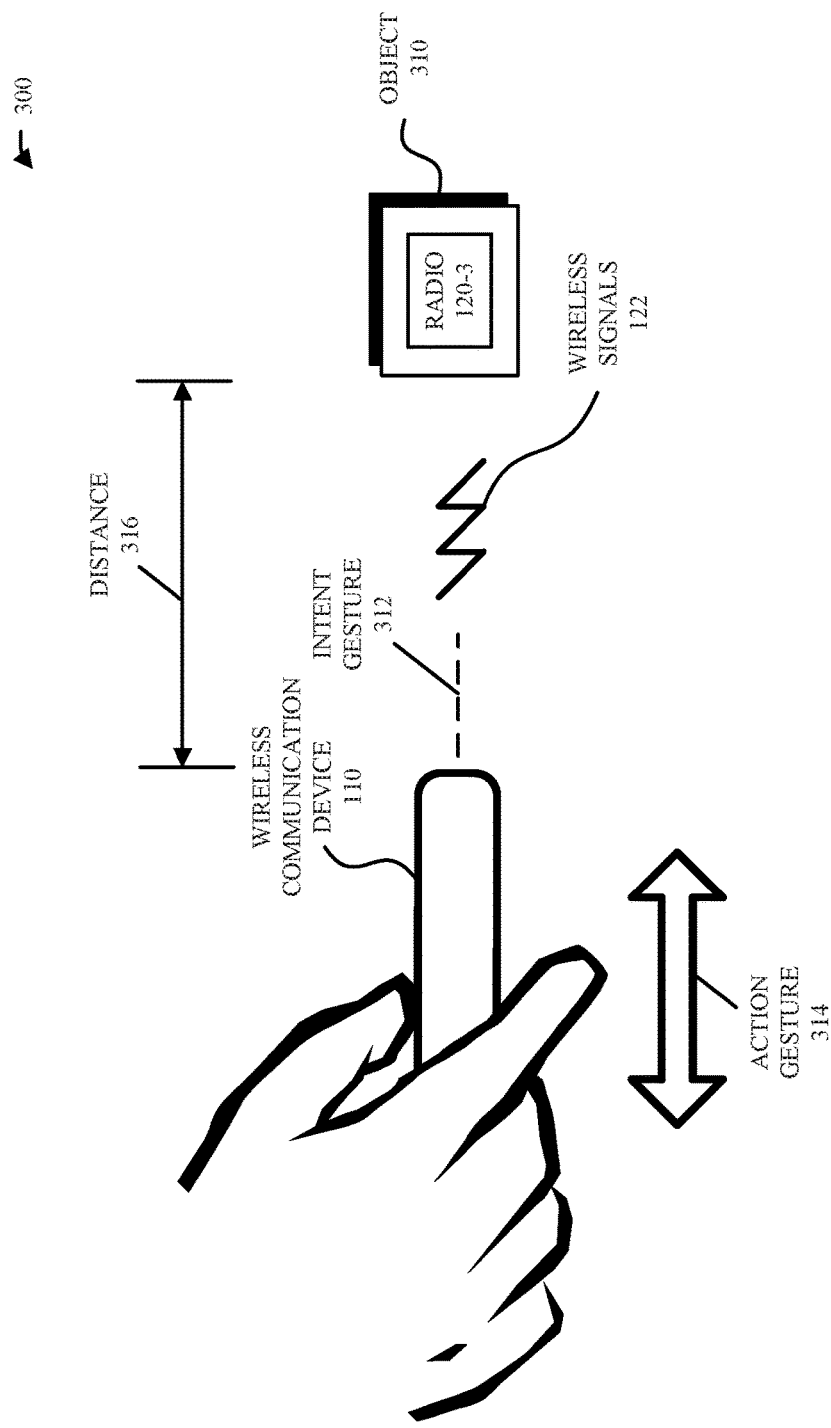
FIGS. 3, 4, and 5 provide drawings illustrating examples of control of an object using one or more gestures based on wireless ranging.

FIG. 3 provides a drawing 300 illustrating an example of control of an object using gestures based at least in part on wireless ranging. In particular, during the user-interface technique, a user may use wireless communication device 110 to control a physical device, e.g., physical device 112, or to generate control input for a physical device using interaction with a virtual representation of an object, e.g., virtual representation 114 by performing one or more gestures or motions, e.g., in two or three dimensions. Wireless communication device 110 is illustrated generating gesture input with respect to object 310, which can be an actual device or a virtual representation. For example, a user may use their cellular telephone to control the volume or the selected channel of a television, or to turn the room lights on or off by performing a gesture, such as by moving wireless communication device 110 up and then down (or vice versa). Alternatively, the user may control a virtual representation of a light switch at a predefined physical location (such as physical location 116 in FIG. 1) in a room or an environment 108 in FIG. 1 (i.e., there may not be a physical light switch at the predefined physical location). Note the predefined physical location (and, more generally, a predefined physical location in three-dimensional space) may have been specified by the user using wireless communication device 110 during a training process, such as by bringing wireless communication device 110 proximate to or touching the physical location and activating a virtual command icon in a user interface displayed on a touch-sensitive display on wireless communication device 110, or by touching wireless communication device 110 to the physical location and verbally stating a command or an instruction that is monitored by wireless communication device 110 and interpreted using a speech-recognition technique.

During the user-interface technique, the user may specify (or otherwise indicate) object 310 using an 'intent gesture' 312, such as by extending wireless communication device 110 toward or in the general direction of object 310 (such as, e.g., within 5° of object 310). Then, the user may perform an 'action gesture' 314, e.g., by moving wireless communication device 110 relative to object 310. In one example, wireless communication device 110 can be moved up or down relative to object 310, e.g., to signal an increase or decrease in a value, respectively. Other gestures also may be used, such as by providing lateral and/or rotational movement. Moreover, a gesture can be simple (e.g., involving one movement, such as a vertical or horizontal movement) or complex (e.g., involving two or more movements, such as a combination of horizontal, vertical, lateral, and/or rotational movements). These operations may be performed while the user is pointing wireless communication device 110 toward or in the general direction of object 310.

In order to detect intent gesture 312, wireless communication device 110 may measure its orientation relative to the position or location of object 310. For example, object 310 may be identified based on a generic or a unique identifier that is communicated by object 310, and the relative position may be determined based on the wireless ranging (e.g., using wireless signals 122), the metric (such as the RSSI), and/or the orientation. Moreover, to detect action gesture 314, wireless communication device 110 may measure the movement, acceleration, and/or distance 316, e.g., using sensor input and/or wireless ranging. Note that the wireless ranging may be performed at or in one or more bands of frequencies, such as at or in: a 2 GHz wireless band, a 5 GHz wireless band, an ISM band, a 60 GHz wireless band, an ultra-wide band, etc.

In addition, ambient sound may be used by wireless communication device 110 to determine whether object 310 is in the same environment 108 (FIG. 1) as wireless communication device 110, such as the same room (as opposed to an adjacent or neighboring room). For example, the ambient sound recorded by object 310, which is shared with wireless communication device 110 via a wireless communication channel (such as a WLAN), may be compared with the ambient sound measured by wireless communication device 110. If these are the same, wireless communication device 110 and object 310 may be in the same room. Alternatively or additionally, wireless communication device 110 may output one or more acoustic chirps or sound(s) (which may be at or in a band of frequencies that are outside of the range of frequencies a human can hear) that can be detected by object 310, e.g., if there is no intervening physical barrier.

More generally, one or more of the measurements performed by wireless communication device 110 may be used to disambiguate one or more potential target devices in environment 108 (FIG. 1), such as object 310, from one or more other devices, such as physical device 118. For example, object 310 facing the user of wireless communication device 110 may have the same orientation, a different height, and/or the same or a different RSSI as another object in the environment. In conjunction with distance 316, the one or more measurements may be used to identify object 310 from all of the available devices. Furthermore, as noted previously, a potential target device may be excluded based on the ambient sound. For example, ambient sound may indicate that a device is located in a pocket or purse and, thus, is less likely to be the target of an intent gesture 312 for pairing or sharing of information.

In some implementations, an altimeter can be used to exclude one or more potential target devices, e.g., that are below a table or are located in a pocket/bag, when they are not likely intended to be designated by an intent gesture 312. In another example, one or more ultrasonic chirps or 60 GHz transmissions can be used to exclude potential target devices within primary radio range or wireless proximity of wireless communication device 110, but that are outside of a relevant physical space or physical proximity (e.g., the excluded potential target devices may be located in a different room or stored inside of a container).

When two or more potential target devices cannot be separated in one or more of these ways, then the user of wireless communication device 110 may be asked to choose among a set of potential target devices that were identified. For example, a user interface with a list of potential target devices may be displayed on a display in wireless communication device 110. The user can then select the intended target, e.g., of the intent gesture 312, from the interface and provide a desired action gesture 314 or other such control input.

While the preceding discussion included illustrative examples of intent gesture 312 and action gesture 314, in general these gestures may include a wide variety of motions and rotations in two or three dimensions, such as: linear motion in one or more directions, rotation about one or more axes, motion along an arc, virtual tapping, figure-based gestures (e.g., a figure-8 gesture), a gesture in the shape of a letter or a number, combinations of linear motion(s) and rotation(s), etc. More generally, action gesture 314 may have an intuitive correspondence to the type of change or the desired control operation. For example, as shown in FIG. 4, which provides a drawing 400 illustrating an example of control of an object using gestures, an up and/or down action gesture 410 may be used to increase (or decrease) a value or setting, such as the temperature setting of a heater or thermostat, or the position of an object (such as a window share or screen). Similarly, as shown in FIG. 5, which provides a drawing 500 illustrating an example of control of an object using gestures, action gesture 510 may involve a left and/or right rotation that corresponds to changing a value or setting, such as the volume of an entertainment device.

In one example, a user may point their cellular telephone at a television. Through wireless ranging, the cellular telephone may determine that the television is within range (i.e., is close enough to be the intended target device). Accelerometer and/or gyroscope input may provide a further indication of relative motion that can be interpreted as an intent gesture 312, indicating that wireless communication device 110 is being used to command (e.g., the action gesture) the television, e.g., object 310. Further, one or more action gestures (e.g., any of 314, 410, and/or 510) can be provided to indicate one or more commands to control the television. For example, the user can twist the cellular telephone to the right to increase the volume of the television or to change the channel.

The user-interface technique may also be used to intuitively pair the wireless communication device 110 with another electronic device so that the paired electronic devices can subsequently communicate with each other. For example, by performing the intent gesture 312 and the action gesture (314, 410, and/or 510), a user may be able to remotely indicate a desire to exchange or share data wirelessly with the physical device. When these operations are performed, the wireless communication device 110 and/or the physical device may display a message in a user interface, requesting confirmation and/or authorization for the pairing. In addition, the other physical device may agree to the pairing for a specified time interval (e.g., 10 min or an hour), after which the pairing may be disabled. In this way, the user of wireless communication device 110 may maintain control of the pairing process, which also may help ensure that the pairing is secure, such as by confirming that the paired physical device is in the same environment (such as the same room). By providing directional intent and action gestures, wireless communication device 110 may avoid pairing with a device that is trying to electronically spoof or impersonate the object 310, with which pairing is intended. Similarly, the directional intent and action gestures can avoid accidental pairing with a device other than object 310 that is proximate, but at a different location or elevation within the environment. This approach may also help to reduce the complexity of sharing information and/or pairing. For example, passwords may not be needed during the pairing process. In some embodiments, after the intent gesture and the action gesture(s), the wireless communication device and the physical device can exchange encryption keys.

In another example, the wireless communication device 110 can be pointed in the direction of an object with which there is intent to pair or for which there is intent to issue a command. The camera of wireless communication device 110 may capture an image of all objects in the field of view and can present a selectable, on-screen interface showing one or more candidate devices. The user can then select the device (and optionally, e.g., protocol) with which to pair.

In still another example, wireless communication device 110 can be pointed at object 310 to claim a resource or to obtain information. For instance, wireless communication device 110 can be pointed (e.g., using intent gesture 312 with or without an action gesture 314, 410, and/or 510) at a cab (e.g., object 310) to hail it. Further, wireless communication device 110 can be pointed (e.g., using intent gesture 312 with or without an action gesture 314, 410, and/or 510) at a restaurant (or an object 310 associated with the restaurant) to obtain ratings or to make a reservation. Similarly, wireless communication device 110 can interact with (e.g., set-up or print to) a printer by pointing at it. For example, an intent gesture 312 and an action gesture 314, 410, and/or 510 can be provided at the wireless communication device 110 to send information to a printer (e.g., to initiate a print job) or to initiate control of one or more settings/configurations.

Wireless ranging and directionality also may be used to obtain information from one or more sensors. For example, wireless communication device 110 can be pointed toward a sensor (e.g., a thermostat or a tire pressure gauge) to obtain a reading. In some implementations, an intent gesture 312 with or without an action gesture 314, 410, and/or 510 can be used to initiate communication of the sensor data. Similarly, one or more intent and/or action gestures can be provided at wireless communication device 110 to retrieve information from a server, such as by interacting with an item or a display in a store to check an attribute, such as price or availability information.

Moreover, identification of object 310, e.g., by wireless communication device 110, may be facilitated by an identifier (generic or unique) that is selectively transmitted by object 310. For example, the identifier may be a persistent, unique identifier that is associated with a particular electronic device (e.g., object 310). Wireless communication device 110 can store the persistent, unique identifier (e.g. locally or in the cloud) and can associate the identifier with a person, object, or location (e.g., in contact information). When the identifier is detected in a received wireless communication, the wireless communication device 110 can provide an indication that the known electronic device (e.g., object 310) is proximate. Alternatively, the identifier may be transient or temporary, such as an identifier assigned by an application executing on wireless communication device 110 or object 312. For example, a ride-share application may temporarily assign an identifier to wireless communication device 110, which it can then broadcast. Further, the ride-share application can provide the transient identifier to a device corresponding to an assigned driver to facilitate pick-up. Similarly, an identifier (persistent or transient) corresponding to the driver's device can be provided to wireless communication device 110 to verify the driver. A transient identifier may expire after a predetermined amount of time, such as an hour, or upon completion of a transaction. Any number of persistent and transient identifiers can be associated with a device or an object, e.g., to facilitate identification across a variety of scenarios.

Furthermore, an assigned identifier may be varied over time to protect the user's privacy and to provide security. In particular, an identifier may be assigned by an optional server 126 in FIG. 1 (which may be accessed via network 124 in FIG. 1, such as a wired or a wireless network) and may be updated periodically (such as after a time interval, e.g., 5 min or 1 day, has elapsed). Additionally or alternatively, an identifier may be assigned as a one-time identifier, e.g., for a particular transaction. In some embodiments, the identifier can be an anonymous identifier that can be persistently assigned to a device or object, such as object 310.

The anonymous identifier can then only be resolved by other devices with which the anonymous identifier and an item of identification information have been shared.

In order to reduce power consumption, wireless communication device 110 and/or object 312 may only transmit one or more identifier(s) periodically or upon an event, such as detection of an identifier associated with a known contact. Additionally or alternatively, wireless communication device 110 and/or object 312 may only attempt to receive one or more identifier(s) when one or more conditions are met, such as being in proximity of another device (known or unknown), being engaged in a transaction involving another device, being in a particular are (e.g., within a geo-fenced region), in response to user input, and/or based on an event (e.g., an appointment or meeting). For example, a Bluetooth low energy (BLE) receiver may periodically scan for an advertisement (or other message) that includes an identifier from, e.g., object 312. The scan rate can vary based on one or more factors, such as motion, time, and/or available power. In response to detecting a known identifier, wireless communication device 110 may activate one or more other communication interfaces and may enable wireless ranging, e.g., so that wireless communication device 110 can receive a message from object 312 and/or determine a direction and/or distance 316 to object 312.

Moreover, as discussed above, the user-interface technique may facilitate the use of virtual objects. These embodiments may include defining virtual objects and controlling them through wireless ranging/directional control input. In some embodiments, interaction with a virtual object, e.g., virtual representation 114, can be based on the orientation of the wireless communication device 110 and a received intent gesture, without performing wireless ranging.

For example, a virtual object or a virtual representation can be established in a particular physical location, such as a virtual light switch or a virtual thermostat by a door. The virtual object can be physically represented by a visual item (e.g., sticker) or can be purely virtual, corresponding only to one or more coordinates. The virtual object may also be defined by an associated physical device. For example, a projector can define a virtual control, e.g., on a wall, and can advertise the virtual control's position, allowing other electronic devices to manipulate the virtual control to effectuate real input to the projector.

As noted previously, in embodiments with virtual objects a device (e.g., wireless communication device 110) may define a virtual device in a particular location, e.g., a virtual control corresponding to a particular location on a wall. Note that the virtual device can be defined as part of a larger system. For example, a facility may define a virtual thermostat adjacent to every entry door (e.g., at a light switch). Alternatively, the virtual device may be defined by a particular device, for example, a projector may define a control on a wall or other surface and may wirelessly advertise the position of the control, thereby allowing other electronic devices to manipulate the virtual control as though it were real.

In this way, a wireless communication device 110 (e.g., a cellular telephone or wearable) may be able to function as a control device, e.g., a dynamic remote control. Further, the wireless communication device 110 may be able to provide control input to a wide-variety of objects, e.g., object 310, through gestures, without been configured to have specific input mechanisms. This may allow the display of wireless communication device 110 to serve as a proxy touch screen for a larger monitor, and sensors/inputs such as the compass, gyroscope, accelerometer, altimeter, touch input and/or microphone can be used to control inputs and/or outputs associated with the monitor. In some embodiments, wireless communication device 110 can be used as a second screen corresponding to a primary display (note that it may or may not mirror the primary display). Then, gesture-based (including touch-based) controls can be provided to control the primary display (e.g., pinch, zoom, scroll, swipe etc.).

Furthermore, gesture-based control input, e.g., to wireless communication device 110, may be used to perform functions such as the transfer of content between electronic devices. For example, one or more gesture-based control inputs to wireless communication device 110 can be used to send (e.g., "throw") content to a second electronic device, to pull content from a second electronic device, to take control of the second electronic device (e.g., take ownership of a computer and have it replicate your content/settings), etc. Thus, one or more gesture-based inputs (e.g., flip, push, rub, swipe, or tap) can be used to indicate a transfer from (or to) wireless communication device 110 to (or from) another device, such as a larger display or a computer. Similarly, gesture-based input to wireless communication device 110 can be used to move something from one device to another, using wireless communication device 110 as a data carrier.

In some implementations, a virtual object may encompass constructs such as a virtual queue (or line), e.g., for service. For example, a virtual queue can be defined in association with an entity or resource (e.g., a ticket booth or store) and electronic devices in proximity can register in the virtual queue by transmitting an associated identifier (e.g., a unique, transient identifier) to a host device maintaining the virtual queue. The virtual queue position for a device (e.g., wireless communication device 110) can be maintained while the device remains in proximity of the physical location of the virtual queue or until the queue is processed. Further, the position in the virtual queue also can be presented to the registered device and can be updated. The host device can notify a registered device when its turn (e.g., at the ticket booth) arrives or approaches.

In addition to cost savings, the use of virtual representations or virtual objects for corresponding physical devices also may allow the environment to be more aesthetically pleasing by replacing less attractive physical devices (such as light switches) with an attractive placeholder (such as a ceramic object) or by removing physical devices altogether. This approach also allows a virtual representation to be moved, at will, by simply re-defining the location associated with the virtual representation. Then, when the user performs the intent gesture and the action gesture when pointing their electronic device, e.g., wireless communication device 110, toward the new location, an associated operation(s) may be performed.

In some embodiments, the gesture used to control the associated physical device may be implicit. In such embodiments, proximity determined by wireless ranging may be used to engage a controllable device, without associated intent and action gestures. For example, a light may turn on (and then off) as a user walks by a predefined location associated with a virtual representation or a virtual object. Similarly, a door lock may unlock as a user device approaches a door, a traffic light may change to green (if conditions permit) when the user device arrives at an intersection, etc. Thus, the disclosed techniques may be used for proximity-based control.

Moreover, the disclosed techniques may also be used to provide cooperative situational awareness, such as when an electronic device ahead of the direction of travel experiences an event, e.g., undergoing a sudden deceleration. The electronic device can notify other electronic devices, e.g., through a broadcast message, of a potentially dangerous situation.

In some embodiments, the disclosed techniques are facilitated by one or more optional tags, such as optional tag 128 (FIG. 1) in environment 108 (FIG. 1). For example, a tag may be a low-cost system-on-a-chip that harvests power from radio-frequency energy and/or has an associated power supply. The tag 128 can output one or more signals, e.g., in response to a received command. For example, the tag 128 can output RF signals and/or acoustic signals (such as "chirps").

In some embodiments, a tag 128 in environment 108 (FIG. 1) harvests power over the air (e.g., it may receive power in the form of signals at 24 GHz) and communicates through a brief signal or chirp (e.g., by emitting a signal at 60 GHz). This communication may have a range up to, e.g., 100 ft., and may be directional. In some implementations, the 24 GHz power signal may have an identifier encoded in the signal. In such implementations, if the tag does not recognize the identifier, it may not respond. The time duration for a tag to respond to a start pulse (e.g., once it has indicated it is powered and operational) may be known. Note that a wireless communication device may measure the phase and angle of arrival to determine the direction, and may use the time of arrival or the time of flight to determine the distance between the wireless communication device and the tag. Accordingly, the tag 128 may be used to generate or to supplement wireless ranging computations.

Figure 6:
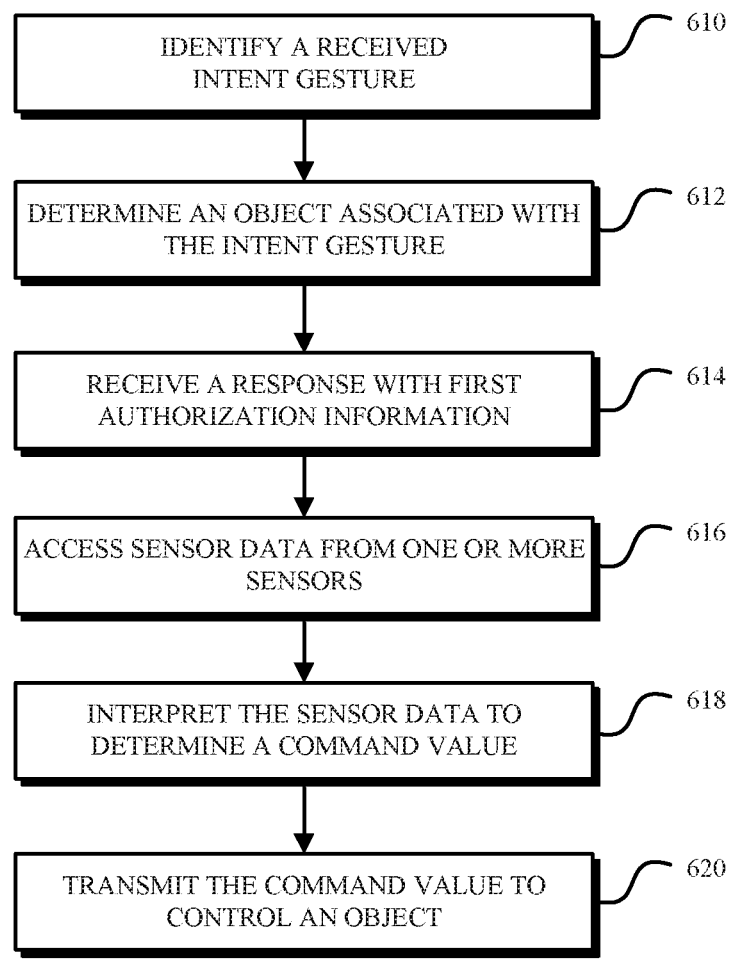
FIG. 6 provides an example method for controlling an object using a wireless communication device.

FIG. 6 is a flow diagram illustrating an example of a method 600 for controlling an object using a wireless communication device, such as wireless communication device 110 in FIG. 1. During operation, the wireless communication device identifies a received intent gesture (operation 610) indicating intent to control an object located proximate to the wireless communication device. Then, the wireless communication device determines the object associated with the intent gesture (operation 612). For example, the wireless communication device uses wireless ranging to determine an object within range that also is located in a direction and/or elevation corresponding to a position and/or orientation of the wireless communication device, e.g., based at least in part on the intent gesture. Further, the wireless communication device accesses sensor data associated with one or more sensors of the wireless communication device (operation 614) and interprets the sensor data to determine a command value (operation 616). For example, the wireless communication device compares the sensor data to one or more action gestures (e.g., based on action gesture profiles stored on the wireless communication device) to identify one or more intended commands. The wireless communication device then generates and transmits a command value, e.g., using one or more messages, to control the object (operation 618). In some implementations, the one or more messages can be transmitted to the object based on an identifier advertised by, or otherwise associated with, the object.

In some embodiments of method 600, there may be additional, different, and/or fewer operations. Furthermore, the order of the operations may be changed, and/or two or more operations may be combined into a single operation or performed in parallel.

Figure 7:
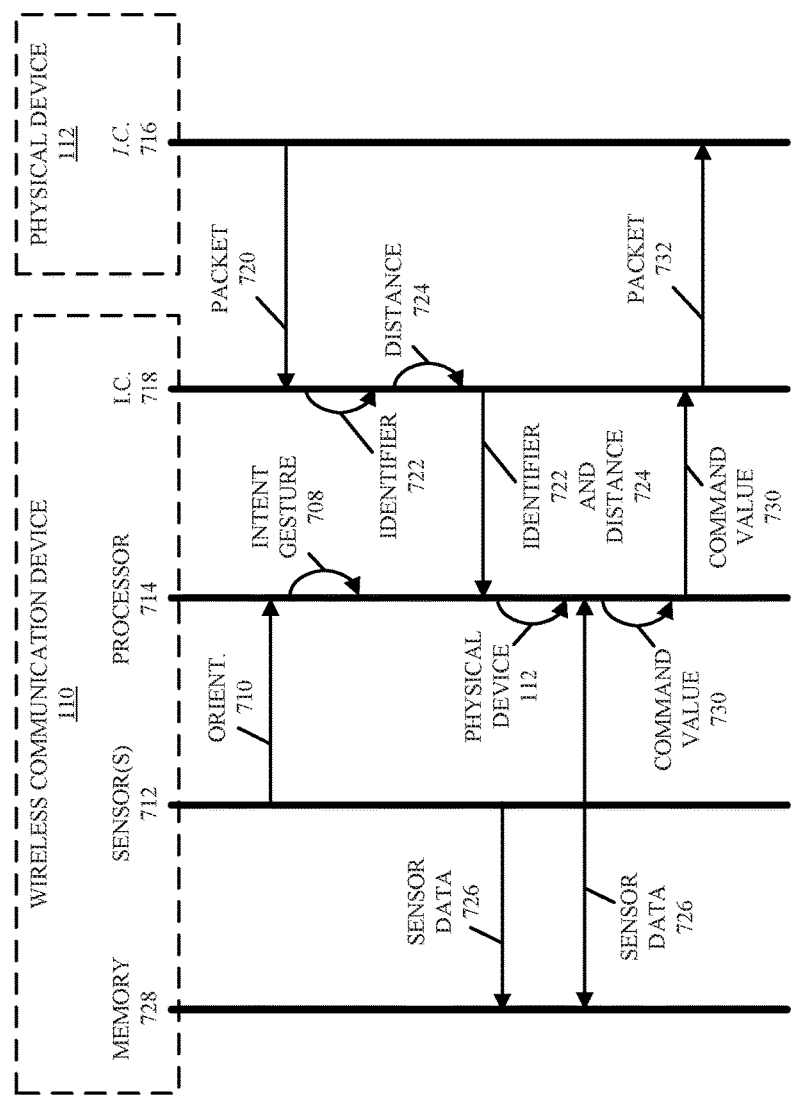
FIG. 7 provides an example of communication among the electronic devices in FIG. 1.

Embodiments of the user-interface technique are further illustrated in FIG. 7, which presents a drawing 700 illustrating communication among wireless communication device 110 and physical (or electronic) device 112 (which is used as an illustrative example). A user may perform an intent gesture 708, e.g., by pointing or orienting 710 wireless communication device 110 toward physical device 112. In some implementations, the intent gesture 708 may include both an orientation component and a motion component, such as a motion advancing wireless communication device 110 toward physical device 112. Processor 714 in wireless communication device 110 may identify the intent gesture 708, e.g., based on orientation 710 and any other associated motion, as measured by one or more sensors 712 (e.g., a gyroscope, accelerometer, and/or compass). The intent gesture 708 may be interpreted as user intent to control physical device 112.

Interface circuit 718 in wireless communication device 110 receives a packet 720 (or frame) transmitted by interface circuit 716 in physical device 112. Packet 720 includes an identifier 722 associated with physical device 112. Further, packet 720 can include information specifying a transmission time of packet 720. In conjunction with a determined arrival time of packet 720 (based on the speed of propagation of the wireless signals that conveyed packet 720), interface circuit 718 (or processor 714) may determine a distance 724 to physical device 112. Additionally or alternatively, wireless communication device 110 can communicate one or more other packets with physical device 112 to perform a wireless ranging operation. Based on identifier 722 and/or distance 724, processor 714 may identify physical device 112.

Further, an action gesture may be performed at wireless communication device 110 corresponding to a command or a command value. One or more of sensors 712 measure sensor data 726 during the action gesture and may store the measured sensor data in memory 728. Processor 714 may access sensor data 726 (e.g., by receiving it from the sensors 712 and/or retrieving it from memory 728), and interpret the sensor data 726 to determine a command value 730 corresponding to the action gesture. Further, interface circuit 718 may transmit a packet 732 including the command value 730 to interface circuit 716. Upon receiving the packet 732, physical device 112 can implement the command value 730.

Representative Embodiments

In some embodiments, a wireless-communication-device-implemented method for controlling an object includes: (i) identifying, by the wireless communication device, an intent gesture indicating an intent to control the object, where the object is located proximate to the wireless communication device; (ii) determining, by the wireless communication device, the object associated with the intent gesture based at least in part on a wireless ranging operation; (iii) accessing sensor data generated by one or more sensors associated with the wireless communication device; (iv) interpreting the sensor data to determine a command value; and (v) transmitting the command value to control the object.

In some embodiments, the object includes a physical object. In some embodiments, the physical object includes a computing device, a display, a printer, a communications device, an audio device, an appliance, a wearable device, a home automation device, an environmental control, or an accessory. In some embodiments, the object includes a virtual object. In some embodiments, the virtual object includes a proxy for a physical object at a different location. In some embodiments, the wireless ranging operation includes using a wireless transmission characteristic to determine a distance between the wireless communication device and the object. In some embodiments, the accessed sensor data includes an orientation value corresponding to the wireless communication device, the orientation value being determined using at least one of: a compass, an accelerometer, or a gyroscope. In some embodiments, the command value includes a command to pair the wireless communication device with the object. In some embodiments, the command value includes a command to change an operational setting of the object. In some embodiments, the command value includes a command to execute a function. In some embodiments, the method further includes using an ultrasonic chirp to determine proximity of the object. In some embodiments, the method further includes receiving from the object, responsive to the command value, a response including a sensor value. In some embodiments, the command value includes a request for access to a resource.

In some embodiments, a wireless communication device includes: (i) an interface circuit configured to use at least one wireless communication protocol to communicate wirelessly with an object; (ii) one or more sensors configured to measure sensor data; (iii) a processor, communicatively coupled to the interface circuit and the one or more sensors, configured to execute a program module; and (iv) a memory, communicatively coupled to the processor, configured to store the program module, the program module includes instructions for: identifying, by the wireless communication device, an intent gesture indicating an intent to control the object, where the object is located proximate to the wireless communication device; determining, based at least in part on wireless ranging, the object associated with the intent gesture; accessing sensor data generated by the one or more sensors; interpreting the accessed sensor data to identify an action gesture; and transmitting, using the interface circuit, a command value corresponding to the action gesture to control the object.

In some embodiments, the action gesture includes a complex gesture. In some embodiments, the determining the object is further based at least in part on receiving an identifier associated with the object. In some embodiments, the program module further includes instructions for initiating a pairing operation with the object.

In some embodiments, a computer-program product for use in conjunction with a wireless communication device includes a non-transitory computer-readable storage medium and a computer-program mechanism embedded therein to control an object, the computer-program mechanism including: (i) instructions for identifying, by the wireless communication device, an intent gesture indicating an intent to control the object, where the object is located proximate to the wireless communication device; (ii) instructions for determining, by the wireless communication device, the object associated with the intent gesture based at least in part on wireless ranging; (iii) instructions for accessing, by the wireless communication device, sensor data generated by one or more sensors associated with the wireless communication device; (iv) instructions for interpreting the accessed sensor data to determine an action gesture; and (v) instructions for transmitting a command corresponding to the action gesture to control the object.

In some embodiments, the instructions for determining the object further include instructions for determining an orientation of the wireless communication device, based at least in part on sensor data generated by the one or more sensors associated with the wireless communication device. In some embodiments, the instructions for determining the object further include instructions for ignoring another object based at least in part on the orientation of the wireless communication device and the wireless ranging.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A wireless-communication-device-implemented method for controlling an object, comprising:
   identifying, by the wireless communication device operated by a user, an intent gesture indicating an intent to control the object, wherein the object is located proximate to the wireless communication device;
   determining, by the wireless communication device, the object associated with the intent gesture based at least in part on a wireless ranging operation, wherein the wireless ranging operation comprises using a wireless transmission characteristic to dynamically determine at least one of a distance between the wireless communication device and the object or a direction of the object relative to the wireless communication device to distinguish the object associated with the intent gesture from other proximal objects;
   in response to determining the object, identifying, by the wireless communications device, an action gesture performed by the user, the action gesture indicating an intent to provide a command value to control the object by accessing sensor data generated by one or more sensors associated with the wireless communication device;
   in response to identifying the action gesture, interpreting the sensor data to determine the command value; and
   transmitting the command value to control the object.

2. The method of claim 1, wherein the object comprises a physical object.

3. The method of claim 2, wherein the physical object comprises a computing device, a display, a printer, a communications device, an audio device, an appliance, a wearable device, a home automation device, an environmental control, or an accessory.

4. The method of claim 1, wherein the object comprises a virtual object.

5. The method of claim 4, wherein the virtual object comprises a proxy for a physical object at a different location.

6. The method of claim 1, wherein the accessed sensor data includes an orientation value corresponding to the wireless communication device, the orientation value being determined using at least one of: a compass, an accelerometer, or a gyroscope.

7. The method of claim 1, wherein the command value comprises at least one of a command to pair the wireless communication device with the object, a command to change an operational setting of the object, a command to execute a function, or a request for access to a resource.

8. The method of claim 1, further comprising:
using an ultrasonic chirp to determine proximity of the object.

9. The method of claim 1, further comprising:
receiving from the object, responsive to the command value, a response comprising a sensor value.

10. A wireless communication device, the wireless communication device including:
an interface circuit configured to use at least one wireless communication protocol to communicate wirelessly with an object;
one or more sensors configured to measure sensor data;
a processor, communicatively coupled to the interface circuit and the one or more sensors, configured to execute a program module; and
a memory, communicatively coupled to the processor, configured to store the program module, wherein the program module includes instructions for:
identifying, by the wireless communication device operated by a user, an intent gesture indicating an intent to control the object, wherein the object is located proximate to the wireless communication device;
determining, based at least in part on a wireless ranging operation, the object associated with the intent gesture, wherein the wireless ranging operation comprises using a wireless transmission characteristic to dynamically determine at least one of a distance between the wireless communication device and the object or a direction of the object relative to the wireless communication device to distinguish the object associated with the intent gesture from other proximal objects;
accessing sensor data generated by the one or more sensors;
in response to determining the object, interpreting the accessed sensor data to identify an action gesture performed by the user; and
transmitting, using the interface circuit, a command value corresponding to the action gesture to control the object.

11. The wireless communication device of claim 10, wherein the action gesture comprises a complex gesture.

12. The wireless communication device of claim 10, wherein the determining the object is further based at least in part on:
receiving an identifier associated with the object.

13. The wireless communication device of claim 10, wherein the program module further includes instructions for:
initiating a pairing operation with the object.

14. A computer-program product for use in conjunction with a wireless communication device, the computer-program product comprising a non-transitory computer-readable storage medium and a computer-program mechanism embedded therein to control an object, the computer-program mechanism including:

instructions for identifying, by the wireless communication device operated by a user, an intent gesture indicating an intent to control the object, wherein the object is located proximate to the wireless communication device;
instructions for determining, by the wireless communication device, the object associated with the intent gesture based at least in part on a wireless ranging operation, wherein the wireless ranging operation comprises using a wireless transmission characteristic to dynamically determine at least one of a distance between the wireless communication device and the object or a direction of the object relative to the wireless communication device to distinguish the object associated with the intent gesture from other proximal objects;
instructions for accessing, by the wireless communication device, sensor data generated by one or more sensors associated with the wireless communication device;
instructions for interpreting the accessed sensor data in response to determining the object to determine an action gesture performed by the user; and
instructions for transmitting a command corresponding to the action gesture to control the object.

15. The computer-program product of claim 14, wherein the instructions for determining the object further comprise:
instructions for determining an orientation of the wireless communication device, based at least in part on sensor data generated by the one or more sensors associated with the wireless communication device.

16. The computer-program product of claim 15, wherein the instructions for determining the object further comprise:
instructions for ignoring another object based at least in part on the orientation of the wireless communication device and the wireless ranging.

17. The method of claim 1, wherein the wireless ranging operation determines the distance and the direction, and wherein the distance is determined using a bi-directional exchange of two or more messages and the direction is determined by using multiple elements of an antenna array to measure different times and/or phases of an arrival of a signal.

18. The method of claim 1, wherein:
action gesture profiles that associate action gestures with corresponding command values are stored in a memory of the wireless communication device; and
interpreting the sensor data to determine the command value further comprises comparing the sensor data with the stored action gesture profiles to determine the command value corresponding to the action gesture.

19. The method of claim 1, wherein the wireless communication device and the object are located in an environment that employs one or more tags that are configured to output signals comprising at least one of radio frequency (RF) signals and acoustic signals, and further comprising:
determining, by the wireless communication device, at least one of its direction and distance with respect to at least one of the one or more tags using the output signals therefrom to assist the wireless ranging operation.

* * * * *